(12) United States Patent
Dalal et al.

(10) Patent No.: US 7,636,830 B1
(45) Date of Patent: Dec. 22, 2009

(54) SIMULTANEOUS ALLOCATION OF STORAGE FOR MULTIPLE LOGICAL VOLUMES

(75) Inventors: Chirag Deepak Dalal, Maharashtra (IN); Vaijayanti Rakshit Bharadwaj, Sunnyvale, CA (US); Ronald S. Karr, Palo Alto, CA (US)

(73) Assignee: Symantec Operation Corporation, Cupertino, CA (US)

( * ) Notice: Subject to any disclaimer, the term of this patent is extended or adjusted under 35 U.S.C. 154(b) by 160 days.

(21) Appl. No.: 10/767,399

(22) Filed: Jan. 29, 2004

(51) Int. Cl.
*G06F 12/00* (2006.01)
(52) U.S. Cl. .................. 711/173; 711/162; 711/111; 711/165
(58) Field of Classification Search .............. 711/162, 711/165, 170
See application file for complete search history.

(56) References Cited

U.S. PATENT DOCUMENTS

| | | | |
|---|---|---|---|
| 5,819,310 A * | 10/1998 | Vishlitzky et al. ........... 711/114 |
| 6,405,284 B1 * | 6/2002 | Bridge ........................ 711/114 |
| 6,728,831 B1 * | 4/2004 | Bridge ........................ 711/112 |
| 6,748,489 B2 * | 6/2004 | Soejima et al. ............. 711/114 |
| 2003/0074528 A1 * | 4/2003 | Soejima et al. ............. 711/114 |

* cited by examiner

*Primary Examiner*—Matt Kim
*Assistant Examiner*—Michael C Krofcheck
(74) *Attorney, Agent, or Firm*—Campbell Stephenson LLP

(57) ABSTRACT

A method, system, computer system, and computer program product to allocate storage resources among multiple logical volumes. In response to a request to perform a set of operations on multiple logical volumes, a set of allocations of available storage space for performing the set of operations is made. At the time of identifying the storage regions to use for each allocation, the remaining operations and the storage regions that would be available for performing the remaining operations are examined. The rules for implementing each of the logical volumes can be evaluated as part of this examination. If it is apparent that one of the remaining operations will fail based upon a particular set of allocations, space allocated for a previous operation can be de-allocated and alternative allocations can be examined to find a set of allocations that enable the request to be performed successfully.

22 Claims, 3 Drawing Sheets

SIMULTANEOUS ALLOCATION OF STORAGE FOR MULTIPLE LOGICAL VOLUMES

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

As businesses increasingly rely on computers for their daily operations, managing the vast amount of business information generated and processed has become a significant challenge. Most large businesses have a wide variety of application programs managing large volumes of data stored on many different types of storage devices across various types of networks and operating system platforms. These storage devices can include tapes, magnetic disks, optical disks, and other types of storage devices.

Today, storage area networks (SANs) can be used to provide hundreds of storage devices for use by several hosts. Allocating storage devices for use by a particular application program can be a difficult task when the storage devices are provided via a SAN. One approach to making storage devices easier to use and configure is to create an abstraction that enables storage to be viewed in terms of logical storage devices, rather than in terms of the physical devices themselves. For example, physical devices can be logically combined into a single logical storage device that provides the storage capacity of the combined physical storage devices. Such logical storage devices are referred to herein as "logical volumes." Logical volumes are abstractions consisting of an array of logical memory blocks that store data. While it is said that logical memory blocks store data, in reality the data is stored in physical memory blocks of the underlying physical devices (e.g., hard disks) allocated directly or indirectly to the logical volume.

Configuring a logical volume is a complex task when tradeoffs between performance, reliability, and cost are taken into account. AQ storage administrator must keep track of how particular volumes are implemented so that subsequent reconfigurations of a logical volume do not render the logical volume unsuitable for the purpose for which the logical volume was created. Finally, when a large amount of data is stored using a large number of logical volumes, it is possible that some physical storage devices are allocated to logical volumes such that resources are wasted. Utilization of storage with a certain unintended characteristic can prevent the creation of other logical volumes due to unavailability of those resources.

A solution is needed that allocates resources (e.g., physical storage devices) for multiple logical volumes so that resources are best used to meet organizational needs. The resources allocated should be suitable for the purpose for which the logical volume was created.

SUMMARY OF THE INVENTION

The present invention provides a method, system, computer system, and computer program product to allocate storage resources among multiple logical volumes. In response to a request to perform a set of operations on multiple logical volumes, a set of allocations of available storage space for performing the set of operations is made. At the time of identifying the storage regions to use for each allocation, the remaining operations and the storage regions that would be available for performing the remaining operations are examined. The rules for implementing each of the logical volumes can be evaluated as part of this examination. If it is apparent that one of the remaining operations will fail based upon a particular set of allocations, space allocated for a previous operation can be de-allocated and alternative allocations can be examined to find a set of allocations that will enable the request to be performed successfully.

In one embodiment, a method includes determining a set of allocations of available storage space for performing a set of operations in response to a request to perform the set of operations on multiple logical volumes. The method can include identifying a respective set of rules used to configure each of the multiple logical volumes prior to determining the set of allocations. The rules can be used to preserve the intent of the original volume creator for existing logical volumes. In one embodiment, determining the set of allocations may include selecting an operation to be performed on one of the logical volumes and determining a first allocation of storage regions for performing that operation on the selected logical volume. A determination is made whether another operation requested can be performed on another logical volume using storage regions remaining after the first allocation is performed. A respective set of rules for the second logical volume can be examined to determine whether the other operation can be performed.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

Figure 1:
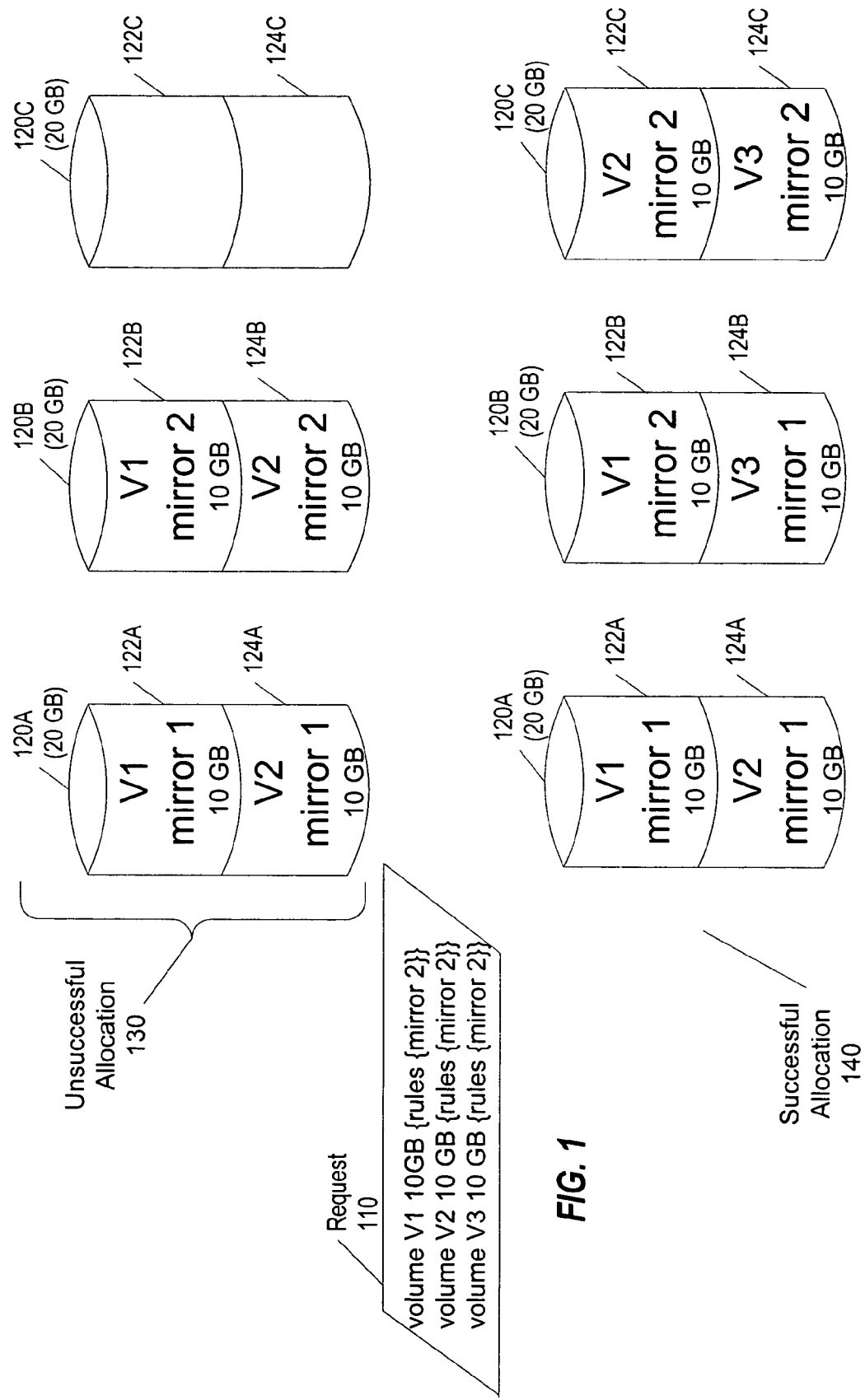
FIG. 1 is a diagram showing a capability specification for creating three logical volumes, with examples of a successful allocation and an unsuccessful allocation in a given hardware environment.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Terminology

Data storage for a logical volume may take form as groups of one or more physical devices, such as one or more dynamic or static random access storage devices, one or more magnetic or optical data storage disks, or one or more other types of storage devices. A physical storage device may be divided into multiple storage regions or blocks that can be used to store data. The term "storage region" is used herein to generically describe data storage, whether that data storage is formed from a set of blocks on a storage device, the entire storage device, or a combination of storage devices. One of skill in the art will recognize that the systems and processes described herein are applicable to all types of data storage and that the use of the term "storage device" or "storage region" is not intended to be limiting.

The term "portion" may include all or only some and not all of the described entity. Similarly, the term "set," when used with reference to an entity, may include one or more entities. The term "subset" of a set of entities may include only one, some but not all, or all of the entities in the set.

Introduction

Today, with the proliferation of intelligent disk arrays, the storage devices available in a disk array provide many features. Through SANs, hosts now have access to hundreds of thousands of storage devices having a variety of properties. Because of these factors, configuring logical volumes in a given environment is no longer a trivial problem.

A solution has been developed by Veritas Software Corporation of Mountain View, Calif. for preserving the configuration intent of a logical volume. This solution is described in co-pending application Ser. No. 10/324,858, filed on Dec. 20, 2002, entitled "Preservation Of Intent Of A Volume Creator With A Logical Volume" and naming Chirag Deepak Dalal, Vaijayanti Rakshit Bharadwaj, Pradip Madhukar Kulkarni, and Ronald S. Karr as inventors, the application being incorporated herein by reference in its entirety.

In application Ser. No. 10/324,858, the creator of a logical volume defines certain characteristics or requirements for the logical volume, such as the number of copies of data to be maintained, the level of performance required of the logical volume, or a requirement that one or more snapshots of the logical volume can be preserved representing the data at different points in time. In response to the user's requirements, the system explores the possibilities for meeting the characteristics or requirements in the existing storage environment. The system then implements the logical volume and stores the intent, along with a corresponding set of rules for configuring the logical volume, with the logical volume. As a result, volume management operations like resizing the volume and evacuating data from the volume use the rules to preserve the intent of the creator.

A logical volume is a virtual disk device that includes one or more physical disks. A logical volume appears to file systems, databases, and other application programs as a physical disk, although the logical volume does not have the limitations of a physical disk. A physical disk is often described as made up of subdisks (which are contiguous storage regions on a disk), and data can be organized on a set of subdisks to form a plex (a copy of the data). A plex can be formed by concatenating the data, striping the data, mirroring the data, or striping the data with parity.

Alternative storage configurations and equivalent logical volume configuration trees are described in detail in co-pending patent application Ser. No. 10/724,245, filed on Nov. 28, 2003, entitled "Identification for Reservation of Replacement Storage Devices for a Logical Volume to Satisfy its Intent" and naming Chirag Deepak Dalal, Vaijayanti Rakshit Bharadwaj, and Vivek Gupta as inventors, the application being incorporated herein by reference in its entirety.

Configuration of Multiple Logical Volumes

Typically an administrator configures one logical volume at a time. As a result, some resources that could have been used to provide additional logical volumes may not be available when those additional logical volumes are to be configured. The present invention addresses the problem of allocating resources for multiple logical volumes so that the best use of all resources in a data center can be made, using the system described in previously cross-referenced patent applications.

FIG. 1 is a diagram showing request 110 for creating three logical volumes, with examples of a successful allocation and an unsuccessful allocation in a given hardware environment. The environment includes three 20-gigabyte storage devices. Storage device 120A has respective 10-gigabyte storage regions 122A and 124A, each of which is a contiguous set of blocks of storage device 120A. Storage device 120B has 10 gigabyte storage regions 122B and 124B, and 20 gigabyte storage device 120C has 10 gigabyte storage regions 122C and 124C. Request 110 indicates that three logical volumes are to be created: V1, V2, and V3. Each of logical volumes V1, V2, and V3 is to be created with two mirrors, as indicated by the "rules {mirror 2}" clause; i.e., two copies of the data will be simultaneously updated. For further information about the syntax of a language used herein for expressing storage allocation requirements, refer to co-pending application Ser. No. 10/327,558, filed on Dec. 20, 2002, entitled "A Language for Expressing Storage Allocation Requirements" and naming Chirag Deepak Dalal, Vaijayanti Rakshit Bharadwaj, Pradip Madhukar Kulkarni, and Ronald S. Karr as inventors, the application being incorporated herein by reference in its entirety.

The mirrors of a mirrored logical volume are not stored on the same storage device, because the goal of mirroring is to maintain a duplicate copy of the data in case of storage device failure. As a result, allocation of storage for a mirrored logical volume involves finding sufficient storage space on multiple storage devices, one for each mirror copy of the data.

Allocating each of these volumes specified in request 110 in sequence produces unsuccessful allocation 130. Mirror 1 of volume V1 is allocated 10-gigabyte storage region 122A of storage device 120A. Even though storage device 120A has 10 gigabytes of space remaining, a different storage device is needed for each mirror. Therefore, mirror 2 of volume V2 is allocated 10-gigabyte storage region 122B of storage device 120B. When volume V2 is allocated in sequence, 10-gigabyte storage region 124A of device 120A is used for the first mirror of volume V2, and 10-gigabyte storage region 124B of device 120B is used for the second mirror of volume V3. When volume V3 is to be allocated in sequence, the only remaining storage space is on a single storage device, device 120C. Although the 20-gigabyte device 120C has sufficient space to store the data for volume V3, device 120C is a single device and cannot be used to store both mirrors. As a result, the allocation of volume V3 fails.

By considering all of the requirements for all of the storage devices simultaneously, successful allocation 140 occurs. One logical volume is selected to create, logical volume V1, and space is allocated to that logical volume. The remaining space available after the initial allocation and the remaining operations requiring allocations are then examined to determine whether the remaining allocations can be performed. For example, after 10-gigabyte storage region 122A of storage device 120A is identified for mirror 1 of volume V1 and 10-gigabyte storage region 122B of storage device 120B is identified for allocation to mirror 2 of volume V2, the remaining allocations and available storage space are evaluated. The remaining 40 gigabytes of storage on devices 120A, 120B and 120C must be used to create two volumes, each having two mirrors. By allocating storage region 124A of storage device 120A to volume V2 mirror 1 and storage region 122C of storage device 120C to volume V2 mirror 2, the respective mirrors of volume V3 can be stored in storage region 124B of storage device 120B and storage region 124C or storage device 120C.

Figure 2:
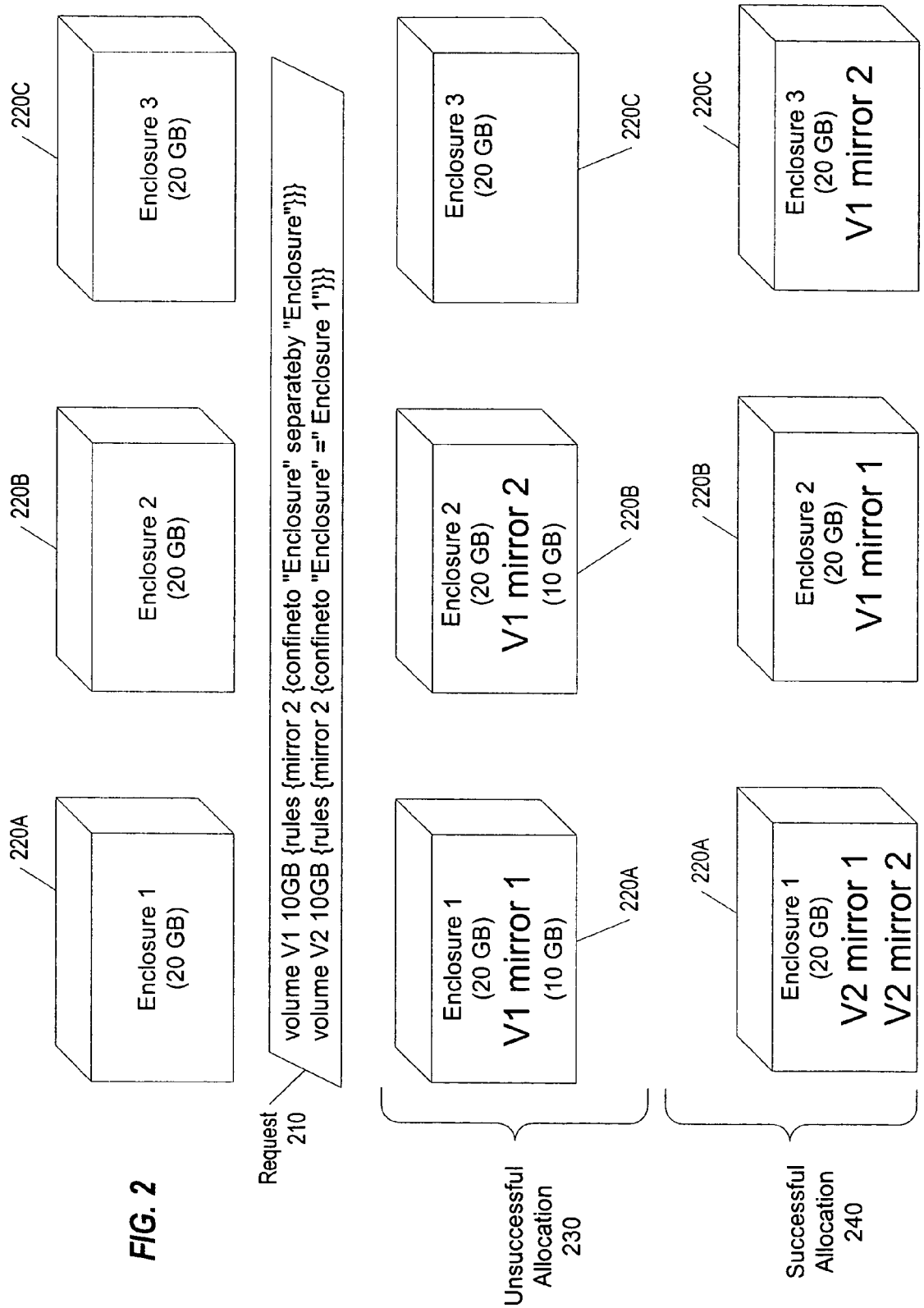
FIG. 2 is a diagram showing a capability specification for creating two logical volumes, with examples of a successful allocation and an unsuccessful allocation in another hardware environment.

FIG. 2 is a diagram showing a request 210 for creating two logical volumes, with examples of a successful allocation and an unsuccessful allocation in another hardware environment. The environment includes three 20-gigabyte disk arrays 220A, 220B, and 220C, each of which contains multiple storage devices in the form of disks. Each of disk arrays 220A, 220B, and 220C has a separate enclosure, respectively Enclosure 1, Enclosure 2, and Enclosure 3. Request 210 indicates that two logical volumes are to be created, volume V1 and V2.

Volume V1 is to be created as a 10-gigabyte logical volume with two mirrors. Each of the mirrors is confined to an enclosure, as indicated by the "confineto" clause, and the two mirrors of volume V1 are to be stored in separate enclosures, as indicated by the "separateby" clause. If volume V1 were allocated without considering the effect on allocation of space for volume V2, a disk within Enclosure 1 may be selected to store mirror 1 of volume V1, and a disk within Enclosure 2 may be selected to store mirror 2 of volume V1. After such an allocation, ten gigabytes will remain within each of Enclosures 1 and 2.

However, request 210 indicates that volume V2 is to be confined to Enclosure 1. Therefore, both 10-gigabyte mirrors of volume V2 are to be stored on disks within Enclosure 1, which will consume the 20 gigabytes available within Enclosure 1. Because volume V2 is to be mirrored, 10 gigabytes of space must be available on each of two disks within Enclosure 1 to preserve the reliability of the mirrors.

Unsuccessful allocation 230 results when space for logical volume V1 is allocated without taking into account the allocation requirements for logical volume V2. In one embodiment, when a determination is made that an allocation is unsuccessful, a previous allocation of storage space can be "backed out" or de-allocated. By examining the rules for all of the logical volumes to be allocated simultaneously, a determination can be made that two 10 gigabyte disks within Enclosure 1 should be reserved for logical volume V2. Allocating space for logical volume V2 in Enclosure 1 prior to allocating space for volume V1 ensures a successful allocation 240.

Figure 3:
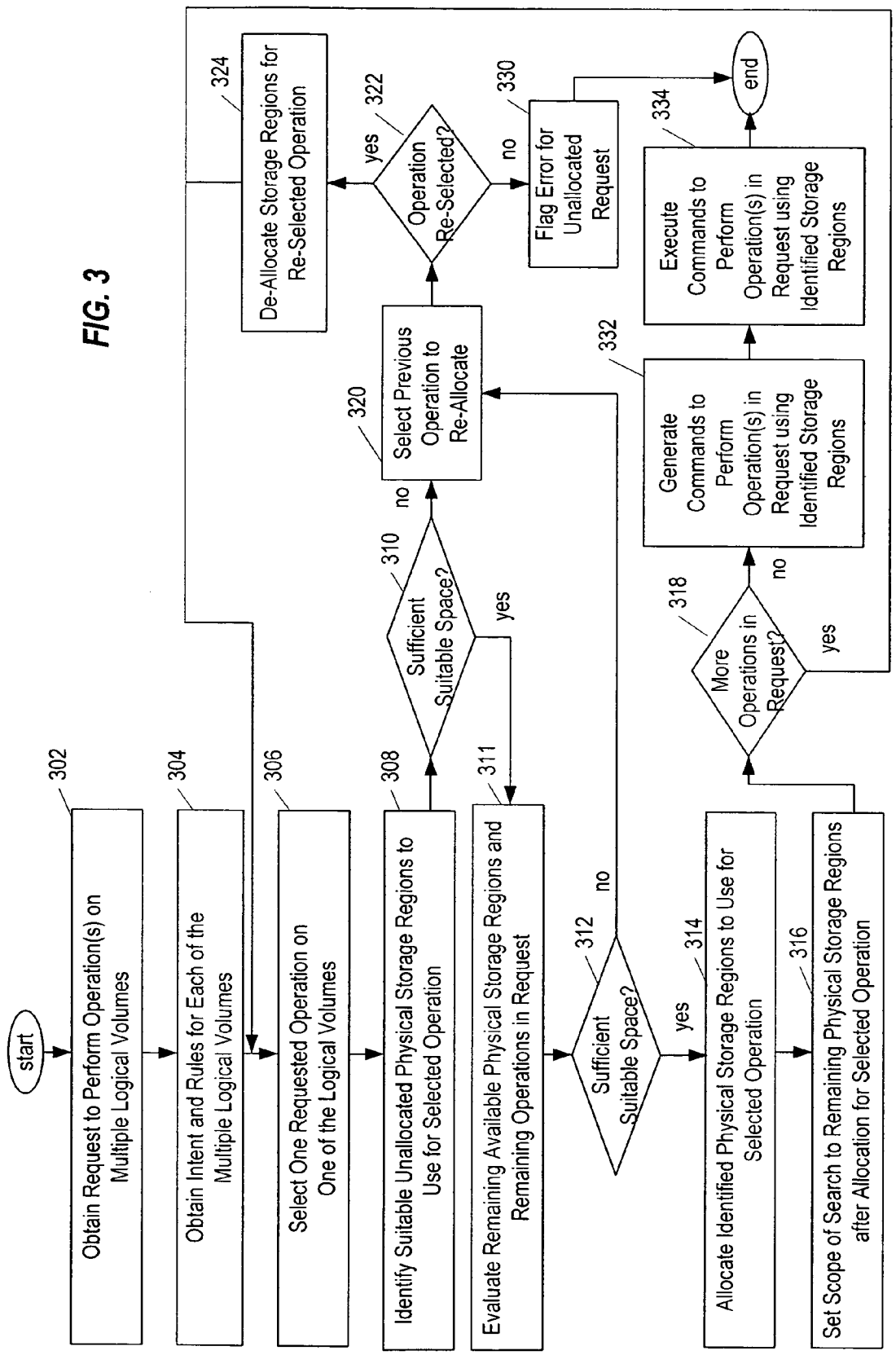
FIG. 3 is a flowchart of one embodiment of a method for simultaneously allocating multiple logical volumes.

FIG. 3 is a flowchart of one embodiment of a method for simultaneously allocating multiple logical volumes. In "Obtain Request to Perform Operation(s) on Multiple Logical Volumes" step 302, a request to perform operations on multiple logical volumes is obtained. The request may be obtained, for example, when a user specifies user requirements for creation of a logical volume, as described in the co-pending patent applications described above. In one embodiment, the user requirements are transformed into a capability specification, and then into rules for implementing the capabilities using available storage information, also as described in the co-pending patent applications described above. The rules can be provided as part or all of a request, such as request 110 of FIG. 1 or request 210 of FIG. 2. Other forms of requests are within the scope of the invention, as long as the request specifies a need for storage space for a logical volume.

It is within the scope of the invention that a single request may include requests to perform a single type of operation on multiple logical volumes, such as a request to create multiple logical volumes. Alternatively, a request may ask to perform different types of operations on different logical volumes. For example, a request may include requests to grow (add storage space to) an existing logical volume, to add a mirror to another existing logical volume, and to create yet another logical volume.

When the request is obtained, control proceeds to "Obtain Intent and Rules for Each of the Multiple Logical Volumes" step 304. An intent and rules are obtained for each of the multiple logical volumes specified in the request. For existing logical volumes, the intent and rules are stored with the existing logical volumes and can be retrieved. For creating new logical volumes, the intent and rules can be determined from the request.

When the intent and rules for the multiple logical volumes are obtained, control proceeds to "Select One Requested Operation on One of the Logical Volumes" step 306. As described above, it is within the scope of the invention for the request to specify allocation requirements for different types of operations and multiple logical volumes. One operation on one of the logical volumes is selected, and control proceeds to "Identify Suitable Unallocated Physical Storage Regions to Use for Selected Operation" step 308. In this step, a search is performed for storage regions satisfying the intent of the logical volume and having a sufficient amount of available storage space. Control proceeds to "Sufficient Suitable Space" decision point 310, where a determination is made whether sufficient storage space meeting the intent of the logical volume was identified to perform the selected operation.

At "Sufficient Suitable Space" decision point 310, if sufficient suitable space was identified, control proceeds to "Evaluate Remaining Available Physical Storage Regions and Remaining Operations in Request" step 311. This evaluation is performed to determine whether the space remaining after the identified physical storage regions are allocated will be sufficient to perform the remaining operations in the request. Control then proceeds to "Sufficient Suitable Space" decision point 312, where a determination is made whether sufficient storage space appears to be available for performing all of the operations in the request.

At "Sufficient Suitable Space" decision point 312, if sufficient storage space is available to perform all of the operations in the request, control proceeds to "Allocate Identified Physical Storage Devices to Use for Selected Operation" step 314, where the identified physical storage devices are allocated to perform the selected operation on the selected logical volume. Control then proceeds to "Set Scope of Search to Remaining Physical Storage Devices after Allocation for Selected Operation" step 316. In this step, the allocated devices are now ineligible to be used for further allocations. Control then proceeds to "More Operations in Request" decision point 318.

At "More Operations in Request" decision point 318, if additional operations are requested in the request, control returns to "Select One Requested Operation on One of the Logical Volumes" step 306. Another operation is selected and the unallocated storage regions are searched to identify storage space to perform the newly-selected operation, as described above.

At "Sufficient Suitable Space" decision point 310, if sufficient storage space is not available to perform the selected operation, control proceeds to "Select Previous Operation to Re-Allocate" step 320. Similarly, if at "Sufficient Suitable Space" decision point 312, sufficient space is not available to perform all of the operations in the request, control proceeds to "Select Previous Operation to Re-Allocate" step 320.

At "Select Previous Operation to Re-Allocate" step 320, an operation for which space has already been allocated is selected to attempt to find a better allocation of space that will enable all of the requested operations to be performed. For example, the most recent operation performed can be "backtracked" and the storage regions for that operation can be de-allocated to attempt a different configuration of storage regions to meet the requirements for all of the operations in the request. Alternatively, another method can be used to determine a previous operation for which space is to be re-allocated. From "Select Operation to Re-Allocate" step 320, control proceeds to "Operation Re-Selected" decision point 322.

At "Operation Re-Selected" decision point 322, if a previous operation has been selected for re-allocation, control proceeds to "De-Allocate Storage Regions for Re-Selected Operation" step 324. The storage regions previously allocated for performing the re-selected operation are de-allocated. In this step, the previously identified storage regions may be marked so that the unsuccessful allocation will not be attempted again. Control returns to "Identify Suitable Unallocated Physical Storage Regions to Use for Selected Operation" step 308 to attempt to find other suitable unallocated storage space for performing the re-selected operation.

At "Operation Re-Selected" decision point 322, if no previous operation is re-selected, no further attempts to identify storage space for the request are to be made. Control proceeds to "Flag Error for Unallocated Request" step 330, where an error can be raised to notify the requester that the storage space could not be allocated for all of the logical volumes requested in the request. In an alternative embodiment, storage space could be allocated for some, but not all, of the operations requested on the logical volumes, and errors could be flagged specifically indicating the allocations that failed. In the embodiment shown in FIG. 3, after an error message for the request is flagged, control proceeds to "More Operations in Request" decision point 318, where a determination is made whether all operations in the request have been processed, as described above.

At "More Operations in Request" decision point 318, if no additional operations are requested, control proceeds to "Generate Commands to Perform Operation(s) in Request using Identified Storage Regions" step 332 to generate the commands to perform the operations. Control then proceeds to "Execute Commands to Perform Operation(s) in Request using Identified Storage Regions" step 334, where the generated commands are executed. Generating and executing commands on logical volumes are described in further detail in the co-pending patent applications cross-referenced above. After generating and executing the commands, processing the request is completed.

Advantages of the present invention are many. The present invention uses information about all of the logical volumes currently existing and rules for creating new logical volumes to allocate space among multiple logical volumes. The allocations are performed such that the original intent of each logical volume is preserved.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
in response to a request to perform a plurality of operations on a plurality of logical volumes,
identifying a first storage region of a plurality of storage regions available for allocation for a first operation of the plurality of operations on a first logical volume of the plurality of logical volumes,
determining whether each of the remaining operations of the plurality of operations can be performed on the remaining volumes of the plurality of logical volumes using one or more subsets of the plurality of storage regions, wherein
the one or more subsets exclude the identified first storage region, and
allocating the first storage region for the first operation, after performing said identifying and said determining, only if said determining determines that each of the remaining operations can be performed.

2. The method of claim 1 further comprising:
if said determining determines that each of the remaining operations cannot be performed using the one or more subsets of the plurality of storage regions,
identifying a third storage region of the plurality of storage regions available for allocation for the first operation, and
determining whether each of the remaining operations of the plurality of operations can be performed using one or more subsets of the plurality of storage regions, wherein
the one or more subsets exclude the third storage region and include the first storage region.

3. The method of claim 1 further comprising:
identifying a respective set of rules to configure each respective logical volume of the plurality of logical volumes prior to identifying the first storage region, wherein
the respective set of rules for each respective logical volume is used to identify a respective storage region to allocate for the respective logical volume.

4. The method of claim 3 wherein the determining whether each of the remaining operations can be performed comprises:
examining a second respective set of rules for a second logical volume of the plurality of logical volumes.

5. The method of claim 1 further comprising:
determining a respective storage region to allocate for each respective operation of the plurality of operations by
determining whether a remaining operation of the plurality of operations can be performed using an unallocated subset of the plurality of storage regions, wherein
the remaining operation excludes the respective operation,
the unallocated subset excludes the respective storage region, and
the unallocated subset excludes an allocated subset of the plurality of storage regions, wherein
each storage region in the allocated subset is allocated to one of the plurality of operations.

6. The method of claim 1 wherein
successful performance of at least one operation of the plurality of operations is dependent on the effect of performing another operation of the plurality of operations.

7. The method of claim 1 wherein
a first operation of the plurality of operations is a first type of operation,
a second operation of the plurality of operations is a second type of operation, and
the first type of operation and the second type of operation are different.

8. The method of claim 1 wherein
the first storage region conforms to a first intent of the first logical volume.

9. The method of claim 8 wherein
the first intent comprises a first rule used to configure the first storage region to provide the first logical volume.

10. The method of claim 1 further comprising:
performing the first operation on the first logical volume using the first storage region.

11. The method of claim 1 wherein
one operation of the plurality of operations is one of the following:
creating the first logical volume;
growing a second logical volume of the plurality of logical volumes; and
adding a mirror to a third logical volume of the plurality of logical volumes.

12. A computer-readable storage medium for storing computer executable instructions, wherein a method is performed in response to executing the instructions, the method comprising:
in response to a request to perform a plurality of operations on a plurality of logical volumes,
identifying a first storage region of a plurality of storage regions available for allocation for a first operation of the plurality of operations on a first logical volume of the plurality of logical volumes,
determining whether each of the remaining operations of the plurality of operations can be performed on the remaining volumes of the plurality of logical volumes using one or more subsets of the plurality of storage regions, wherein
the one or more subsets exclude the identified first storage region, and
allocating the first storage region for the first operation, after performing said identifying and said determining, only if said determining determines that each of the remaining operations can be performed.

13. The computer-readable storage medium of claim 12 wherein the method further comprises:
if said determining determines that each of the remaining operations cannot be performed using the one or more subsets of the plurality of storage regions,
identifying a third storage region of the plurality of storage regions available for allocation for the first operation, and
determining whether each of the remaining operations of the plurality of operations can be performed using one or more subsets of the plurality of storage regions, wherein
the one or more subsets exclude the third storage region and include the first storage region.

14. The computer-readable storage medium of claim 12 wherein the method further comprises:
identifying a respective set of rules to configure each respective logical volume of the plurality of logical volumes prior to identifying the first storage region, wherein
the respective set of rules for each respective logical volume is used to identify a respective storage region to allocate for the respective logical volume.

15. The computer-readable storage medium of claim 14 wherein the determining whether each of the remaining operations can be performed comprises:
examining a second respective set of rules for a second logical volume of the plurality of logical volumes.

16. The computer-readable storage medium of claim 12 wherein the method further comprises:
determining a respective storage region to allocate for each respective operation of the plurality of operations by
determining whether a remaining operation of the plurality of operations can be performed using an unallocated subset of the plurality of storage regions, wherein
the remaining operation excludes the respective operation,
the unallocated subset excludes the respective storage region, and
the unallocated subset excludes an allocated subset of the plurality of storage regions, wherein
each storage region in the allocated subset is allocated to one of the plurality of operations.

17. The computer readable storage medium of claim 12 wherein
successful performance of at least one operation of the plurality of operations is dependent on the effect of performing another operation of the plurality of operations.

18. The computer-readable storage medium of claim 12 wherein
a first operation of the plurality of operations is a first type of operation,
a second operation of the plurality of operations is a second type of operation, and
the first type of operation and the second type of operation are different.

19. The computer-readable storage medium of claim 12 wherein
the first storage region conforms to a first intent of the first logical volume.

20. The computer-readable storage medium of claim 19 wherein
the first intent comprises a first rule used to configure the first storage region to provide the first logical volume.

21. The computer-readable storage medium of claim 12 wherein the method further comprises:
performing the first operation on the first logical volume using the first storage region.

22. The computer-readable storage medium of claim 12 wherein one operation of the plurality of operations is one of the following:
creating the first logical volume;
growing a second logical volume of the plurality of logical volumes; and
adding a mirror to a third logical volume of the plurality of logical volumes.

* * * * *